(12) United States Patent  
Keller et al.

(10) Patent No.: US 7,558,454 B2
(45) Date of Patent: Jul. 7, 2009

(54) OPTICAL FIBER CABLE AND METHOD FOR MAKING THE SAME

(75) Inventors: David Keller, Cary, NC (US); Randie Yoder, Garner, NC (US)

(73) Assignee: Nexans, Paris (FR)

( * ) Notice: Subject to any disclaimer, the term of this patent is extended or adjusted under 35 U.S.C. 154(b) by 240 days.

(21) Appl. No.: 11/438,479

(22) Filed: May 22, 2006

(65) Prior Publication Data

US 2007/0269171 A1  Nov. 22, 2007

(51) Int. Cl.
 *G02B 6/44* (2006.01)
(52) U.S. Cl. ...................... 385/113; 385/114
(58) Field of Classification Search .......... 385/100–113
See application file for complete search history.

(56) References Cited

U.S. PATENT DOCUMENTS

| 6,137,936 A | * | 10/2000 | Fitz et al. ............. 385/113 |
| 6,178,278 B1 | | 1/2001 | Keller et al. ............. 385/109 |
| 6,380,298 B2 | | 4/2002 | Flautt et al. ............. 524/500 |
| 6,813,422 B1 | | 11/2004 | Krishnamurthy et al. .... 385/109 |
| 6,852,592 B2 | | 2/2005 | Lee et al. ............. 438/253 |
| 6,882,784 B2 | | 4/2005 | Mumm et al. ............. 385/100 |
| 6,925,235 B2 | | 8/2005 | Lanier et al. ............. 385/100 |
| 7,050,688 B2 | * | 5/2006 | Lochkovic et al. ......... 385/128 |
| 7,155,093 B2 | * | 12/2006 | Elkins et al. ............. 385/100 |
| 2004/0022504 A1 | * | 2/2004 | Hurley et al. ............. 385/109 |
| 2006/0029340 A1 | * | 2/2006 | Andrews et al. ........... 385/100 |

* cited by examiner

*Primary Examiner*—Frank G Font
*Assistant Examiner*—Eric Wong
(74) *Attorney, Agent, or Firm*—Sofer & Haroun, LLP

(57) ABSTRACT

An optical fiber cable having a plurality of optical fibers, at least one tube surrounding the optical fibers and a plurality of strength members positioned around the tube. A jacket surrounds the tube and the strength members, where the ratio of polymer used to form the tube and the jacket is at ratio of substantially 10:1 versus the strength members in terms of cross sectional area at any point along the cable and where the Young's modulus of the at least one tube and the jacket is substantially in the range of 250-750 N/mm$^2$.

8 Claims, 6 Drawing Sheets

OPTICAL FIBER CABLE AND METHOD FOR MAKING THE SAME

FIELD OF THE INVENTION

The present invention relates to the field of optical fiber cables. More particularly, the present invention relates to an optical fiber cable with improved mechanical properties.

BACKGROUND

In the field of optical fiber cables, optical fibers may typically be loosely bundled (loose tube arrangement) into multi-fiber tubes that are in turn coated with an outer jacket. Because the optical fibers are fragile and attenuation can occur with significant bending of the fibers, the tube and jacket arrangement is used to provide physical protection for the fibers to protect them against various environmental and mechanical stresses.

The manufacturing considerations have become more significant in view of recent attempts to make optical fibers that involve the bundling a plurality of fibers in a first tube and a plurality of fibers in a second tube, and applying a jacket over both tubes simultaneously, resulting in a multi-tube fiber optic cable having two haves, each jacketed independently, but connected via a central and breakable web (herein after collectively referred to as a multi-tube optical fiber cable). When making this product, it is difficult to calibrate the extrusion process so that the web separates without damaging the jacket covering the bundles (tube and yarn combination). Because the web needs to be strong enough to survive initial installation yet easily breakable by the user when desired, without damaging the jacket on either half of the cable, the calibration of the size of the web and extrusion thereof is difficult.

Various draw down and pressure extrusion techniques for the jacket simply move the strength yarns around the tube to one side or the other on both halves of the cable. The end result is that the yarns bunch up to one side periodically, causing the jacket to thin near the connection to the web. This frequently results in damage to the jacket when a user separates the two tubes, as the web is sometimes stronger than the near portion of the jacket to which it is connected. Furthermore, using a process of tube-on extrusion, while possibly allowing the web to form properly, does not provide significant adhesion between the jacket and the yarns.

OBJECTS AND SUMMARY

The present invention looks to overcome the drawbacks associated with the prior art and provides a optical fiber cable that maintains good mechanical properties including smooth jacket extrusion resulting in a properly formed and separatable web, that simultaneously meets the necessary thermal expansion/contraction requirements while using a minimum of glass strength fibers.

To this end, the present invention provides for an optical fiber cable having a plurality of optical fibers, at least one tube surrounding the optical fibers and a plurality of strength members positioned around the tube. A jacket surrounds the tube and the strength members, where the ratio of polymer used to form the tube and the jacket is at ratio of substantially 10:1 versus the strength members in terms of cross sectional area at any point along the cable and where the Young's modulus of the at least one tube and the jacket is substantially in the range of 250-750 N/mm$^2$.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION

Figure 1:
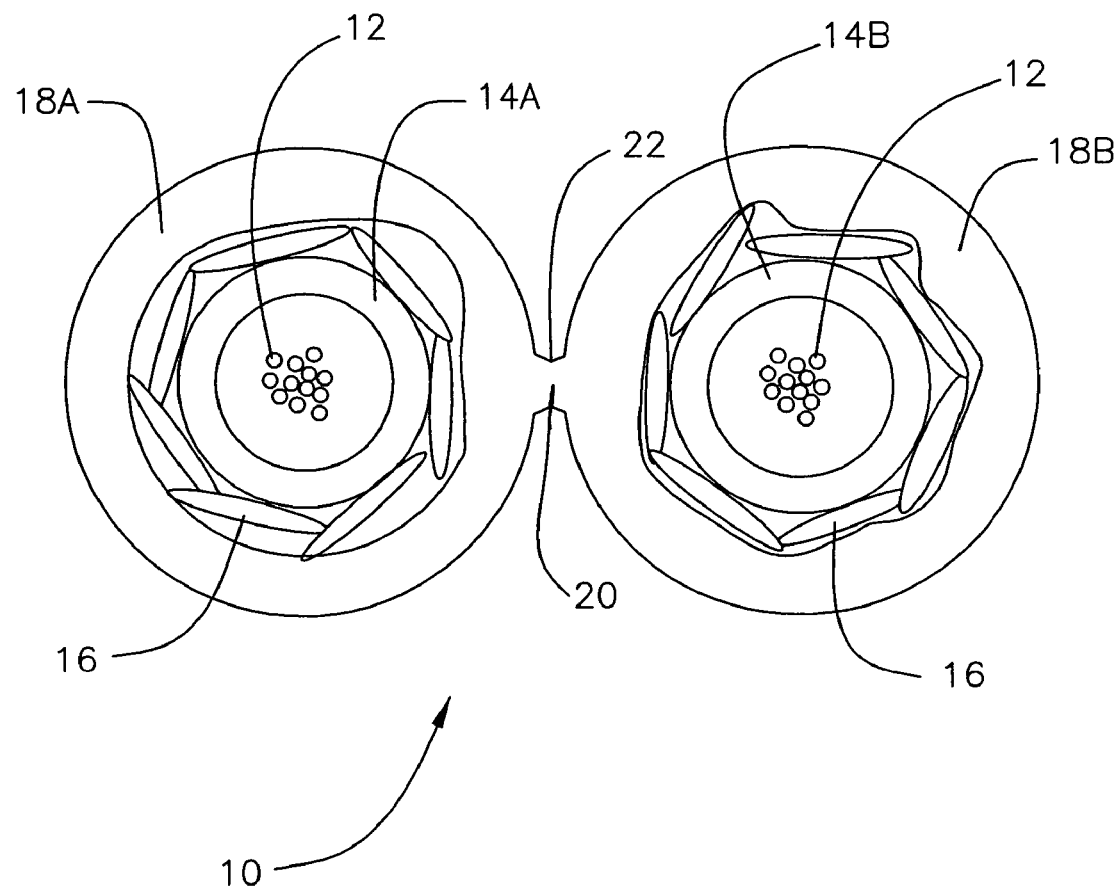
FIG. 1 is a cross section of a multi-tube optical fiber cable, in accordance with one embodiment of the present invention.

In one embodiment of the present invention as illustrated in FIG. 1, a cross section of a twin tube fiber optic cable 10 is shown having a plurality of fibers 12 disposed within first and second tubes 14a and 14b. Each of the tubes 14a and 14b has a plurality of glass strength yarns 16 positioned along their outside circumference. A polymer jacket 18 is disposed around each bundle (tube 14 and yarn 16) forming cable 10. Polymer jacket 18 has two main components 18a and 18b around tubes 14a and 14b respectively, where components 18a and 18b are connected in the middle by a web 20. Web 20 is configured to hold the two halves of fiber optic cable 10 together until some point during installation where the installer may wish, depending on the installation conditions, to separate the two halves of cable 10 by splitting web 20 for some desired length of cable 10.

It is understood that the present arrangement is intended for exemplary purposes and in no way is intended to limit the scope of the present invention. For example, each half of cable 10 includes twelve fibers 12 in each tube 14a and 14b. However, any number of fibers 12 within tubes 14a and 14b may be used as per the desired capacity for cable 10. Furthermore, certain features of the present invention including yarn 16 count and composition and manufacture of jacket 18 may be equally applied to many single tube fiber cable arrangements to beneficial effect.

Turning now to the components of cable 10, in on embodiment of the present invention, fibers 12 typically consist of UV coated optical fibers approximately 250 microns in diameter. It is noted that the use of 250 micron UV coated optical fibers is for illustrative purposes only. Other sized UV coated fibers or even 900 micron TB (Tight Buffer) fibers can also be employed in the present invention, making any dimensional adjustments as necessary.

Tubes 14a and 14b are loose tube arrangement tubes that are extruded over optical fibers 12 resulting in tubes 14a and 14b loosely holding fibers 12 therein. As noted above a typical arrangement may include twelve fibers 12 each within tubes 14a and 14b, but the invention is not limited in this respect.

Cable 10 as shown in FIG. 1 is a twenty-four fiber twin fiber optic cable 10, which is used throughout for exemplary purposes.

In one embodiment of the present invention, seven yarns 16 are used around each tube 14a and 14b. Yarns 16 are preferably Neptco 785 G flexible glass high strength reinforcement elements having super-absorbent coating. Each yarn 16 preferably has a nominal rectangular size of substantially 0.010 inches×0.083 inches (0.25 mm×2.10 mm) for areas of 0.00083 inches$^2$ or 0.525 mm$^2$. The load bearing area is 0.2881 mm$^2$ or roughly 50% of the total cross-sectional area. The additional area is some minimal SAP (Super Absorbent Powder) coating and air space. Any similar multi-filament glass strength yarn used in cable construction, such as non-absorbent glass high strength reinforcement materials with super-absorbent powder applied during processing may be substituted for yarns 16. The significance of the number of yarns 16 in connection with one embodiment used in the construction of cable 10 is explained in more detail below. However, the invention is not limited in scope to a particular number of yarns 16, as long as the end result of the multi-tube fiber optic cable 10 exhibits the desired characteristics.

In one embodiment of the present invention, jacket 18 is formed using a plastic having a low Young's modulus, preferably in the range of 250-750 N/mm$^2$, such as Teknor Apex 910-A10 NL2 or Georgia Gulf 16882 (PVC resins) depending on the desired fire safety standards cable 10 needs to meet. Similar polymer materials can be used for tubes 14a and 14b provided they maintain a similar Young's modulus in the range of 250-750 N/mm$^2$,. The effects of such low plastics having a low Young's modulus is discussed in more detail below.

As noted above, web 20 is disposed between the two halves of cable 10, and configured to allow a user of cable 10 to separate the first half (having tube 14a) from the second half (tube 14b) during installation. Preferably web 20 has a thickness in the range of 381-635 microns (0.020"-0.025") as well as a width likewise in the range of 381-635 microns (0.020"-0.025"), however it is not limited in this respect.

Furthermore, web 20 exhibits a separation notch 22 where web 20 narrows towards the center between the two halves of cable 10, so that the thickness in the middle of web 20 at notch 22 is in the range of 0.010"-0.015". This configuration ensures that the weakest point in web 20 is in the center rather than along a vital portion of jacket 18a or 18b that is protecting the bundle (tube 14 and yarns 16).

Preferably the separation force required is in the range of 1-2.5 lbs., once a small separation in web 20 is made at notch 22 using a knife or other utility tool. Thus, after the small separation a continued notch stress in the low range of 1-2.5 lbs. is maintained by pulling tubes 14 apart, for example in a wishbone format. It is noted that in the absence of the initial cut, assuming web 20 is fully in tack, the present invention contemplates that a significantly higher force between 74-103 lbs is required to break web 20. This ensures that tubes 14 don't prematurely separate during installation until the user desires to separate them. The shape and manufacture of web 20 and separation notch 22 is explained in more detail below with respect to the extrusion head and extrusion process.

Accordingly, the above described cable 10 as shown in FIG. 1, exhibits a number of preferential qualities with respect to its construction, ease of use and durability under adverse thermal conditions as explained below.

First, it is noted that yarns 16 are typically added to optical fiber cables in general to protect them from issues related to thermal stresses. When exposed to cold or hot temperatures the jacket and tube materials, being made of polymers such as PE (Polyethylene, PVC, PVDF, PP etc. . . ), expand and contract along the length of the cable. Likewise, the optical fibers inside the cable expand and contract as well. Because the fibers are made of glass and the jacket and tubes are made from polymers, the jacket and tubes tend to exhibit a greater rate of expansion/contraction than the optical glass (wave guide) fibers. This results in a significant difference in length between the jacket and tubes versus the optical fibers, thereby causing a great deal of mechanical stress on the fibers. This stress is further exacerbated during such expansion/contraction at curved or bent portions of the cable. Glass yarns 16, having contraction and expansion properties similar to optical fibers 12 are thus added to cable 10 to lessen the expansion/contraction of the plastics used in jacket 18 and tubes 14.

For example in prior art arrangements enough strength members or yarns are used such that the cross sectional area of the jacket and tubes is at a ratio of 3:1 to 6:1 plastic to glass. This high ratio of glass to plastic (14.28% to 25% glass by area) helps to keep in-check the tendency of the jacket to constrict and expand under temperature stress, because the glass tends to expand and contract less under thermal stress. However, the glass strength members add significant cost to the production. Furthermore, in some cases where more complex jacket extrusions are concerned, such as multi-tube cables where because of web 20, the options for controlling extrusion flow are more limited, the excess strength members 16 may actually generate a non-laminar flow in the extrudate, cause internal pressure to the molten extrudate and possibly even push through the outside of jacket 18 at certain points. This pressure is significant in cable extrusion, particularly where the drawn down ration and draw balance ration are close to 1.0 as is explained in more detail below.

In the specific example of cable 10, a twin tube optical fiber cable, web 20 is further improved according to the present invention. In prior art cables using more yarns (in the range of 14.28% to 25%) it is more difficult to achieve certain desired cable configurations. For example, twin tube cables require a relatively delicate and difficult to calibrate extrusion of a web 20 between the two halves of a cable. In single tube cables the additional yarns 16 do not pose a particular problem, but in twin cable arrangements, the typical number of yarns 16 interferes with the extrusion of web 20, as explained above because of the generation of a non-laminar flow in the exrudate within the extrusion head. The use of the reduced number of yarns 16 while still maintaining the necessary shrinkback characteristics in the present invention allows for the proper formation of the separatable web 20.

In one embodiment of the present invention, the use of only seven yarns 16 in each half of cable 10 results in a plastic to glass ratio of approximately 10:1 or greater. As noted above, prior art arrangements typically employ a plastic to glass ratio of ratio of 3:1 to 6:1 plastic to glass translating to a 14.28% to 25% glass by area, achieved using twelve or more glass yarns per tube in similar style fiber cables, whereas the present invention only uses seven yarns 16 resulting in 9% or less glass (relative to cross-sectional area).

For example, the following table 1 is comparison between a typical prior art cable having twelve yarns per tube, or a ratio of plastic to glass yarns of about 6:1. Table 1 shows the present invention measurements on top (left is in mm and right is inches) and the prior art is on the bottom.

TABLE 1

| Invention | | | | |
|---|---|---|---|---|
| Tube | 3.00 | mm | 0.118 | inch |
| Tube ID | 1.98 | | 0.078 | |
| Tube area | 3.99 | | 0.006 | |
| Tube | 7.07 | mm^2 | 0.011 | inch^2 |
| Glass area | 0.29 | mm^2 | 0.288 | mm^2 |
| Yarn | 0.58 | mm^2 | 0.001 | inch^2 |
| Yarns | 4.03 | 7 yarns mm^2 | 0.006 | 7 yarns in^2 |
| ID calc area | 11.10 | total mm^2 | 0.017 | total in^2 |
| Jacket ID | 3.76 | Dia | 0.148 | Dia |
| Jacket od | 5.97 | Dia | 0.235 | Dia |
| Jacket | 16.88 | Area mm^2 | 0.026 | Area in^2 |
| Jkt + tube | 20.87 | Area mm^3 | 0.032 | Area in^3 |
| Gl/pl | 0.10 | ratio | 0.097 | ratio |
| PL/GL | 10.35 | ratio | 10.347 | ratio |
| Standard | | | | |
| Tube | 3.00 | mm | 0.118 | inch |
| Tube ID | 1.98 | | 0.078 | |
| Tube area | 3.99 | | 0.006 | |
| Tube | 7.07 | mm^2 | 0.011 | inch^2 |
| Glass area | 0.29 | mm^2 | 0.288 | mm^2 |
| Yarn | 0.58 | mm^2 | 0.001 | inch^2 |
| Yarns | 6.91 | 12 yarns mm^2 | 0.011 | 12 yarns in^2 |
| ID calc area | 13.98 | total mm^2 | 0.022 | total in^2 |
| Jacket ID | 4.22 | Dia | 0.166 | Dia |
| Jacket od | 6.35 | Dia | 0.250 | Dia |
| Jacket | 17.69 | Area mm^2 | 0.027 | Area in^2 |
| Jkt + tube | 21.67 | Area mm^3 | 0.034 | Area in^3 |
| Gl/pl | 0.16 | ratio | 0.160 | ratio |
| PL/GL | 6.27 | ratio | 6.269 | ratio |

* The plastic to glass area ratios in the above table were (area of jacket and tube of one bundle) divided by the (load bearing area per yarn × the number of yarns per bundle).

Thus, the use of a higher plastic to glass ratio achieved using less yarns 16 provides an easier extrusion process regarding the proper formation of web 20 because with the reduced overall percentage of cross sectional area of cable 10, they are less of a hindrance during extrusion. With less yarns 16, coupled with an improved extrusion process detailed below, web 20 is more easily formed and the thickness of jacket 18 near web 20 is more easily controlled.

However, in lowering the number of yarns 16 in the present invention, the beneficial effect with respect to shrinkage and expansion control is reduced. In one embodiment of the present invention, the Young's modulus of the plastic used for jacket 18 and tubes 14 are simultaneously lowered to the range noted above, the initial shrinkage and contraction issues are correspondingly reduced, allowing the smaller number of yarns by area to be sufficient to keep shrinkback to an acceptable 1% range under thermal conditions of −40° C. through +70° C. and exhibits less than 1% jacket shrinkage a 110° C. (two hour exposure).

In one embodiment of the present invention, it is noted that the fiber strain is also advantageously maintained less than 0.5% at 300 lbs. Here fiber strain refers to the longitudinal tensile strength of cable 10 as measured by its change in length at a particular force The desired Young's modulus may be evaluated using the following equation to find the composite thermal coefficient of cable 10 may be computed using:

$$\alpha_c = \sum_{i=1 \, to \, N}^{n} E_i A_i \alpha_i \div \sum_{i=1 \, to \, N}^{n} E_i A_i$$

where $\alpha_c$ is the composite thermal coefficient
$\alpha_i$ is the thermal coefficient of expansion of material i;
$E_i$ is the Young's modulus of material i;
$A_i$ is the cross sectional area of material i; and
N is the number of materials under stress in the cable Thus, using this equation, and given the intended size of cable 10, a particular combination of Young's modulus, cross sectional area $A_i$, and thermal coefficients $\alpha_i$ may be evaluated to ensure that the cable has the proper composite thermal coefficient necessary to meet the desired thermal expansion/contraction characteristics.

For example in the present invention, as noted above, jacket 18 and tubes 14 are made from a PVC having a Young's modulus in the range of 250-750 N/mm². The combination of this plastic composition for jacket 18, the ratio of plastic to yarns being substantially 10:1 or greater and the improved drawn down ratios and draw balance ratios discussed below, provides a number of advantages.

It is understood that the above example of twin tube optical fiber cable 10 is intended as an exemplary embodiment and is in no way intended to limit the scope of the present invention. Any optical fiber cable 10 having similar plastic jacket 18 and tube 14 arrangements in combination with the yarn 16 amounts described above are also within the contemplation of the present invention.

Figure 2:
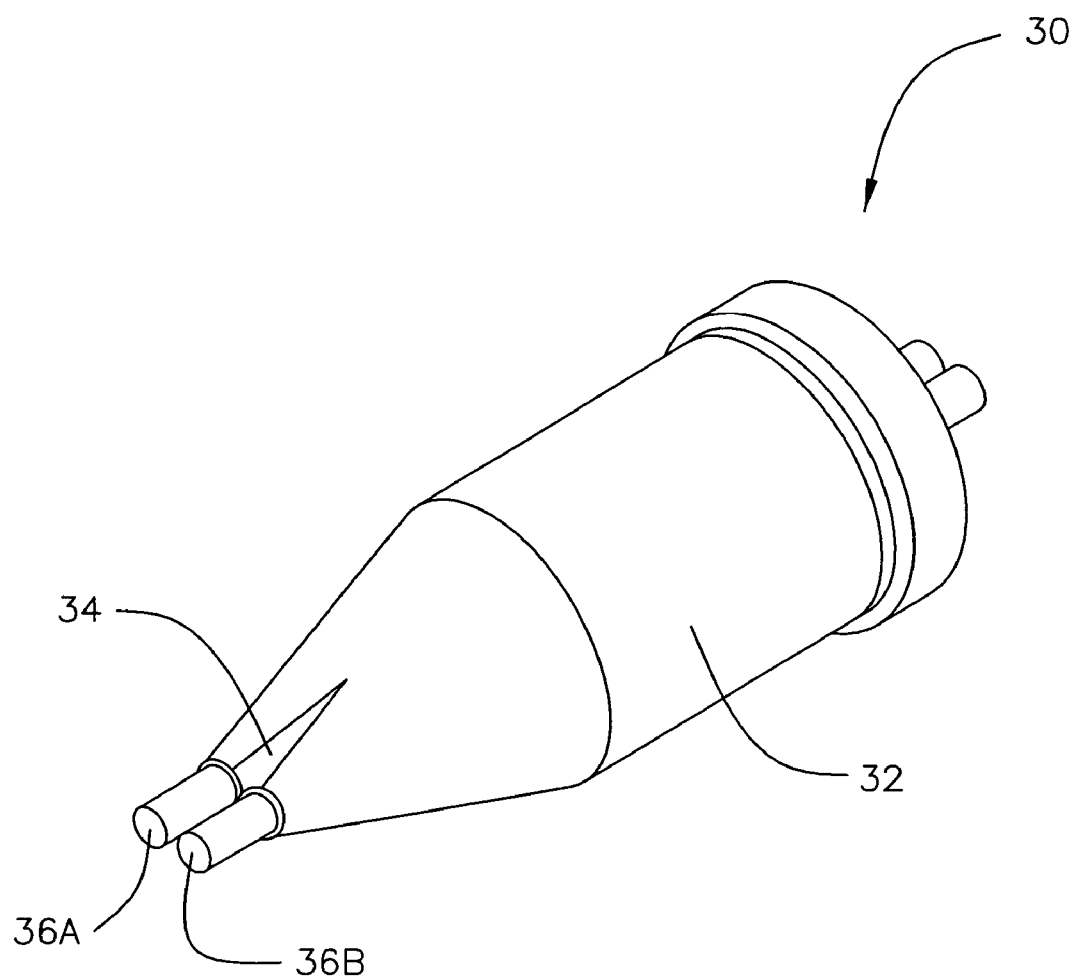
FIG. 2 is image of an extrusion tip, in accordance with one embodiment of the present invention.

Turning now to the process for generating such a twin tube fiber cable 10, in one embodiment of the present invention, cable 10 is generated using a polymer extrusion head (tip and die). As illustrated in FIG. 2, extrusion tip 30 maintains a body 32, a web channel 34 and guide tubes 36a and 36b. Tip 30 is arranged such that tubes 14a and 14b along with optical fibers 12 are pulled through the rear of body 32 and out through the front of tubes 36a and 36b respectively.

Figure 3:
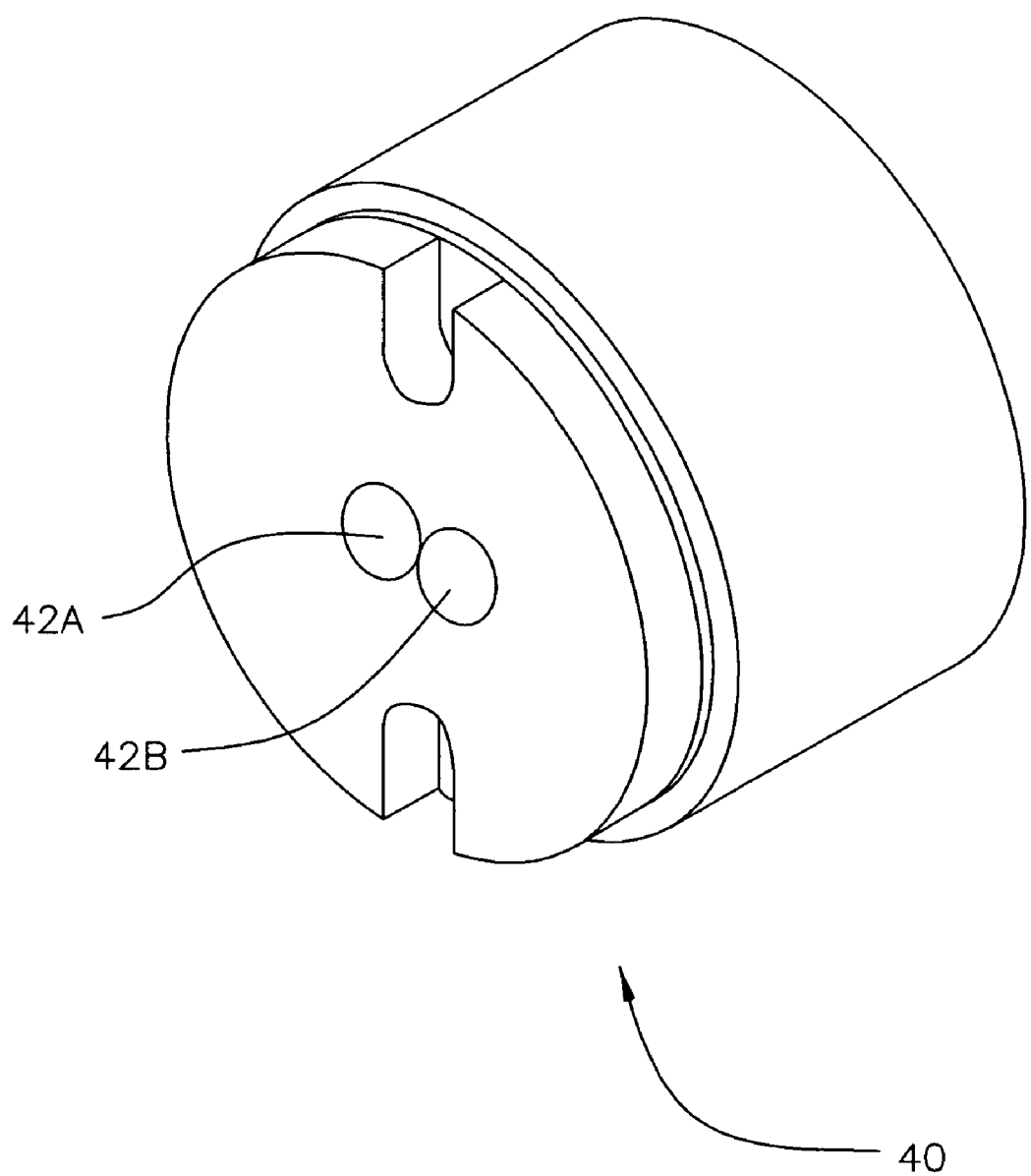
FIG. 3 is an image of an extrusion die, in accordance with one embodiment of the present invention.
Figure 4:
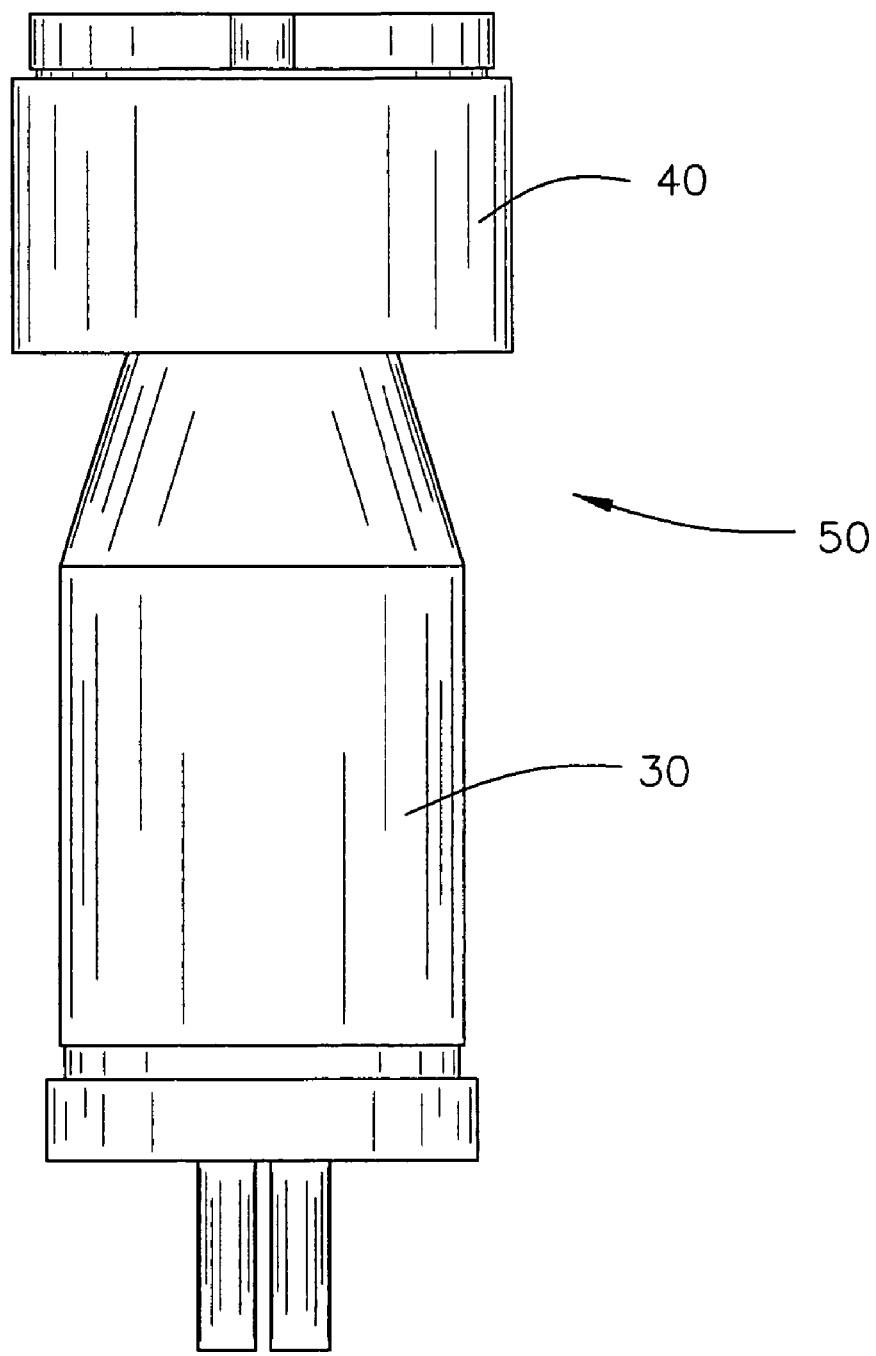
FIG. 4 is an image of an extrusion head showing the extrusion tip of FIG. 2 and extrusion die of FIG. 3, in accordance with one embodiment of the present invention.

As illustrated in FIG. 3, an extrusion die 40 is provided having first and second exit openings 42a and 42b through which tubes 14a and 14b exit, after passing through tubes 36a and 36b, now having jacket 18 thereon. As show in FIG. 4, tip 30 is positioned in the rear of die 40 forming extrusion head 50.

Figure 5:
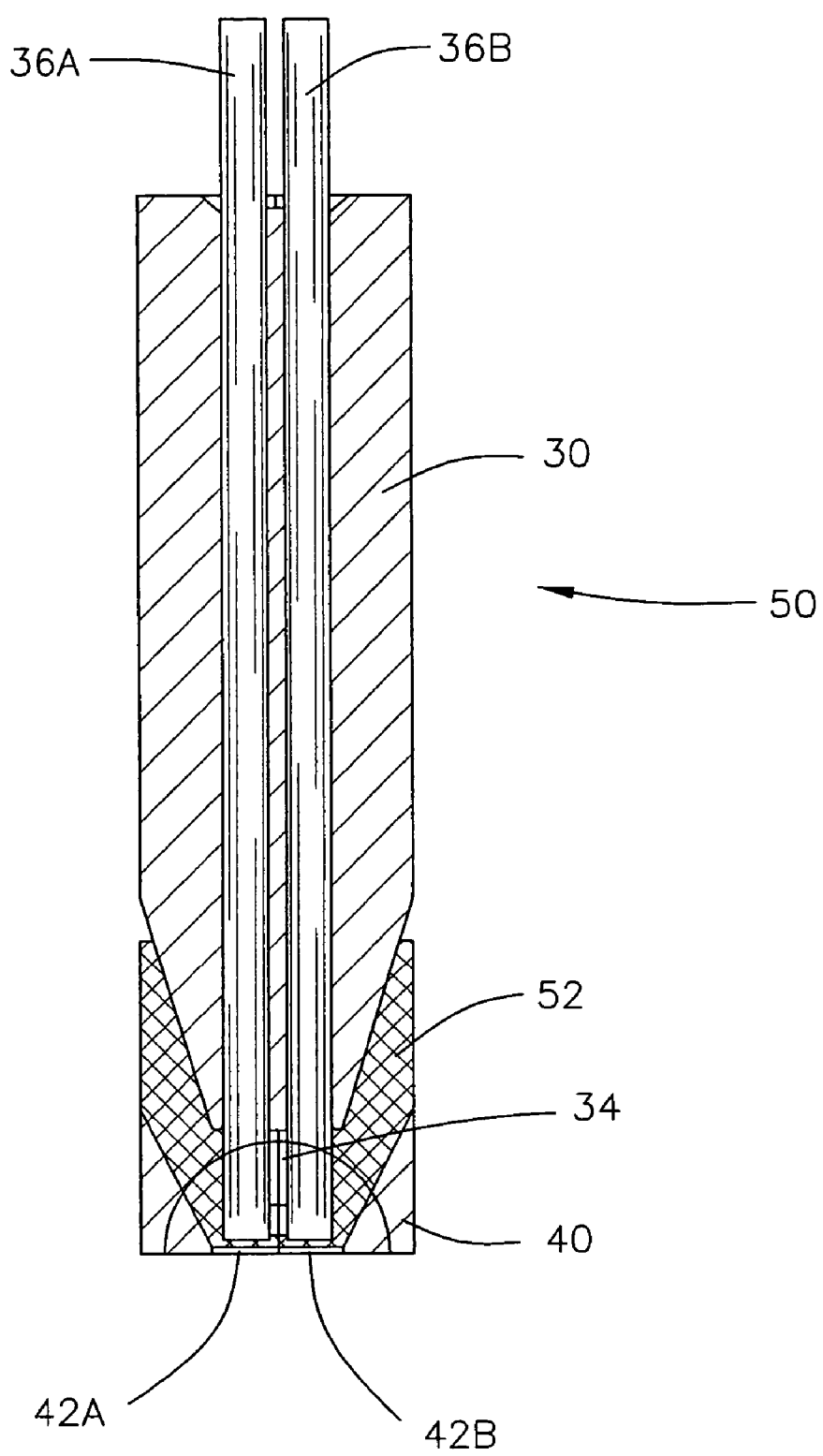
FIG. 5 is a cut away view of the extrusion head from FIG. 4, in accordance with one embodiment of the present invention.

In one embodiment of the present invention as illustrated in cut-away FIG. 5, extrusion head 50 shows tip 30 and head 40, with an extrusion flow channel 52. During creation of multi-tuber optical fiber cable 10, tubes 14 and yarns 16 are drawn through tubes 36 at which time molten polymer flows down through channel 52 over the bundle such that upon exiting die exit openings 42, jacket 18 is extruded, resulting in cable 10 as illustrated in FIG. 1.

In this figure, guide tubes 36a and 36b, extend beyond tip body 32 for approximately 0.5 inches or roughly twice the diameter of one of die exit openings 42a or 42b. This distance is chosen to allow for the ability to adjust the tube angle to make any correction in the extrudate flow or for errors in machining tolerances of the tooling. Center to center distance of tubes 36a and 36b, corresponding substantially to the distance between the centers of each half of cable 10, is approximately 0.2750 inches, but may be adjusted to balance the flow exiting the die. It is understood that the dimension for tubes 36a and 36b and their placement within extrusion head 50 are intended only as example and are no way intended to limit the scope of the invention. Any similar tube arrangement in similar arrangement within extrusion flow channel 52 for creating the cable 10 as described above is within the contemplation of the present invention.

This extension of tubes 36a and 36b from tip body 32 into extrusion flow channel allows the liquid polymer to sufficiently encompass and push bundles (tubes 14 and yarns 16)

away from center web 20. Furthermore, web channel 34 allows for sufficient laminar flow of the extruded plastic to flow towards the web 20 so that it is properly formed upon exit of die 40.

Figure 6:
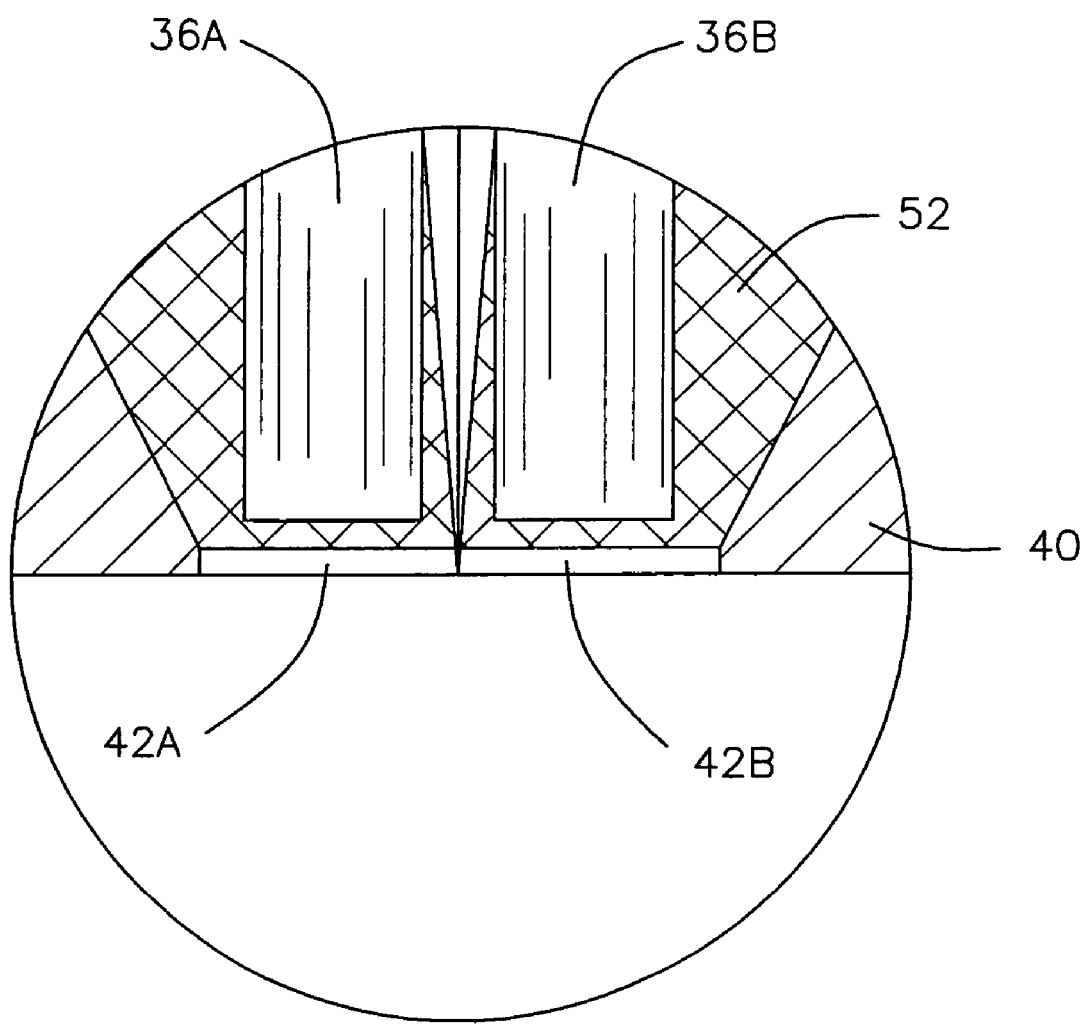
FIG. 6 is a close up view of the extension tubes of the tip from FIG. 2 and the extrusion die from FIG. 3, in accordance with one embodiment of the present invention.

In one embodiment of the present invention, as illustrated in FIG. 6, a close up of tubes 36a and 36b at die exit openings 42a and 42 is shown. The distance between the end of tubes 36 and the exit of openings 42 from die 40 are substantially 0.050 inches, but may be in the range of 0.045" through 0.055." Tubes 36a and 36b have an inside diameter of substantially 0.1830 inches and an outside diameter of substantially 0.0230. Furthermore, the inner diameter of the die exits 42a and 42b are substantially 0.2500, but may be adjusted between 0.240" and 0.260" inches without significantly disrupting the desired drawn down ration and draw balance ratios as discussed below, however a slight change in the tube offset of 0.050" above may be required Turning now to the extrusion of jacket 18, it is noted that an appropriate level of adhesion is required between outer jacket 18 and glass yarns 16 in order for jacket 18 to benefit from yarns 16 with respect to the thermal constriction and expansion properties. Prior art pressure extrusion techniques however generate a significant amount of adhesion, but simply end up pressing all yarns 16 to one side of tube 14 causing jacket 18 to exhibit poor uniformity along cable 10. Tube-on extrusion, where jacket 18 is applied at a wide range of drawn down ratios, but with draw occurring outside of extrusion head 50, does not push the yarns aside as with the pressure technique, but does not provide the requisite adhesion between the jacket and the yarns because the extrudate is already cooling before contacting the bundle.

Thus, in accordance with one embodiment of the present invention, exit tubes 36a and 36b are very close to the die exits 42 in a manner to allow the drawn down to occur inside of extrusion head 50 so as to allow adhesion between yarns 16 in the bundle and jacket 18. Preferably the contact between molten extrudate and yarns 16 within extrusion head 50 is for at least 0.035"-0.055" to ensure proper adhesion.

Furthermore, the thickness of the extruded polymer for jacket 18 is not substantially larger than the final thickness of jacket 18. In the present invention, the closeness of the guide tubes 36 to die exits 42 as well as the dimensions of the diameters of tubes 36 and die exits 42 result in a draw down ratio (DDR) of substantially 1.15 to 1 and a draw balance ration (DBR) of substantially 1 to 1.04. Preferably, both the DDR and DBR are 1.0 For reference the draw down ratio is the calculated as follows:

$$DDR = D_{(D)}^2 - D_{(T)}^2 / D_{(O)}^2 - D_{(I)}^2$$

and the draw balance ratio (DBR) is calculated as follows:

$$DBR = D_{(D)} \cdot D_{(O)} / D_{(T)} \cdot D_{(I)}$$

where $D_{(T)}$=Diameter of the tip; $D_{(D)}$=Diameter of the Die exit; $D_{(O)}$=The outer Diameter of the jacket/tube; and $D_{(I)}$=The inside Diameter of the jacket tube.

In an exemplary embodiment of the present invention and as illustrated more clearly in Table 2, the extrusion head 50 and related bundles are dimensioned to achieve the preferable DDR and DBR of about 1.0.

TABLE 2

| | A | B | C | D |
|---|---|---|---|---|
| 1 | | | At guide tube exit | At Die Exit |
| 2 | Jacket ID | 0.155 | 0.16 | 0.16 |

TABLE 2-continued

| | A | B | C | D |
|---|---|---|---|---|
| 3 | Jacket Wall | 0.045 | 0.045 | 0.045 |
| 4 | jacket OD = | B2 + 2*B3 | 0.25 | 0.25 |
| 5 | Setback | 0 | 0.05 | 0 |
| 6 | Die land | 0 | 0.01 | 0 |
| 7 | Relative setback = | B5 − B6 | 0.0400 | 0.0000 |
| 8 | Relative Tip OD | 0.155 | 0.203 | 0.16 |
| 9 | Relative Die ID = | 0.25 + (B7*2) | 0.32 | 0.25 |
| 10 | | | | |
| 11 | DDR = | (B9^2 − B8^2)/(B4^2 − B2^2) | 1.66 | 1.00 |
| 12 | DRB = | (B9*B2)/(B8*B4) | 1.01 | 1.00 |

In the present example, yarn 16 and tube 14 (bundle) areas have a composite outer diameter of 0.155"-0.165", effectively continue from the guide tube maintaining the 45 degree angle draw down from die 40 keeping the draw ratio balance of "1.00". The position of guide tubes 36 setback provides a relative die diameter at that point of 0.321."

As noted above, the minimum contact length of exposure of molten plastic for jacket 18 to yarns 16 to allow adhesion to yarns 16 is approximately 0.035"-0.045", a feature which is met when extrusion of jacket 18 occurs under these parameters.

In addition to providing the appropriate DDR and DRB for achieving a laminar flow of the extrudate to facilitate the production of web 20, the DDR and DRB of substantially 1.0 also provides an additional advantage in the are of shrinkback, further compensating for the reduction in yarns 16. A DDR and DRB at or near 1.0 is the optimum relationship for rendering a minimum of pent-up or unbalanced forces within the plastic structure. The ultimate relaxation of such forces or shifting to achieve relative balance over time, results in preferable plastic shrinkback characteristics for the plastic of jacket 18. The optimum ratio of 1.0 for DRD and DDR achieved in the present invention, combined with the low modulus of the plastic discussed above, further reduced the need for the aintibuckling fiberglass yarns 16.

Thus, the quantity of yarns 16 is a balance between both the geometrical needs of the forces with the die at extrusion and in the ultimate cable assembly contraction and elongation.

Thus, according to one embodiment of the present invention, a cable 10 is provided where the interrelated combination of: 1) DDR being substantially 1.0; 2) DRB being substantially=1.0; 3) yarn 16 exposure to molten plastic for adhesion resulting in the "lamination" of glass 16 to plastic 18; 4) balanced laminar centering forces; and 5) minimum required added glass yarns 16 for anti-buckling due to adhesion and "relaxed" low modulus plastic are all balanced appropriately such that cable 10 that exhibits acceptable thermal shrinkback characteristics (in the range of 1%) with a well defined and easily separatable web 20.

It is understood that the dimensions and arrangements of tubes 36a and 36b and die exits 42a and 42b as well as the relevant DDR and DBR are intended only as examples. Any similar arrangement configured to producing low draw down ratio and stable draw balance ratio for generating a similar cable 10 is within the contemplation of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An optical fiber cable, said cable comprising:
a plurality of optical fibers; first and second tubes, each with a plurality of fibers therein;
a plurality of strength members positioned around said first and second tubes;
first and second jacket portions disposed over said first and second tubes respectively, surrounding said tubes and said strength members, wherein the ratio of polymer used to form said first and second tubes and said first and second jacket portions is at ratio of substantially 10:1 versus the strength members in terms of cross sectional area at any point along said cable,
and wherein the Young's modulus of the said at least one tube and said jacket is substantially in the range of 250-750 N/mm$^2$; and
a web formed between said first and second jacket portions configured to allow a user to separate said first tube and first jacket portion from said second tube and said second jacket portion wherein the thickness of the first jacket portion covering said first tube is thicker at the point of connection with the web than the width of the web and the thickness of the second jacket portion covering said second tube is thicker at the point of connection with the web than the width of the web at any point along said cable.

2. An optical fiber cable according to claim 1, wherein said strength members are multi-filament glass yarns.

3. An optical fiber cable according to claim 1, wherein the web further comprises a separation notch disposed substantially in the middle of the web, said separation notch being a narrowing portion of said web.

4. An optical fiber cable according to claim 3, wherein said web, once a start separation is made, has a separation strength substantially in the range of 1.0-2.5 lbs of force.

5. An optical fiber cable according to claim 3, wherein said optical fiber cable exhibits shrinkback in the range of substantially 1% or less under thermal stress conditions.

6. An optical fiber cable according to claim 1, wherein the material for said jacket and said at least one tube is PVC.

7. An optical fiber cable according to claim 1, wherein said web, once a start separation is made, has a separation strength substantially in the range of 1.0-2.5 lbs of force.

8. An optical fiber cable according to claim 1, wherein said optical fiber cable exhibits shrinkback in the range of substantially 1% or less under thermal stress conditions.

* * * * *